(12) United States Patent
Baruah et al.

(10) Patent No.: US 12,549,472 B2
(45) Date of Patent: Feb. 10, 2026

(54) SINGLE HIERARCHICAL CONSTRUCT FOR DEFINING A SERVICE IN A SERVICE CHAIN

(71) Applicant: Cisco Technology, Inc., San Jose, CA (US)

(72) Inventors: Pritam Baruah, Fremont, CA (US); Amjad Inamdar, Karnataka (IN); Laxmikantha Reddy Ponnuru, San Ramon, CA (US); Avinash Shah, Pleasanton, CA (US); Jai Prakash Agrawal, Bilaspur (IN)

(73) Assignee: Cisco Technology, Inc., San Jose, CA (US)

( * ) Notice: Subject to any disclaimer, the term of this patent is extended or adjusted under 35 U.S.C. 154(b) by 46 days.

(21) Appl. No.: 18/348,065

(22) Filed: Jul. 6, 2023

(65) Prior Publication Data
US 2024/0348536 A1 Oct. 17, 2024

(30) Foreign Application Priority Data
Apr. 11, 2023 (IN) .............................. 202341026663

(51) Int. Cl.
*H04L 45/247* (2022.01)
*H04L 45/28* (2022.01)

(52) U.S. Cl.
CPC ............ *H04L 45/247* (2022.05); *H04L 45/28* (2013.01)

(58) Field of Classification Search
CPC ........ H04L 45/247; H04L 45/28; H04L 45/22
See application file for complete search history.

(56) References Cited

U.S. PATENT DOCUMENTS

| 2009/0097406 | A1 | 4/2009 | Nilakantan et al. |
| 2015/0026362 | A1* | 1/2015 | Guichard ................ H04L 45/30 709/242 |
| 2015/0085870 | A1* | 3/2015 | Narasimha ............. H04L 45/44 370/409 |
| 2017/0019335 | A1* | 1/2017 | Schultz ................. H04L 45/028 |
| 2017/0310611 | A1 | 10/2017 | Kumar et al. |
| 2017/0339110 | A1* | 11/2017 | Ni ......................... H04W 48/08 |
| 2020/0272501 | A1* | 8/2020 | Chalvadi ............. H04L 67/1001 |

(Continued)

OTHER PUBLICATIONS

International Search Report and Written Opinion for International Application No. PCT/US2024/024141, mailed Jul. 19, 2024, 12 Pages.

(Continued)

*Primary Examiner* — Chris Parry
*Assistant Examiner* — Dixon F Dabipi
(74) *Attorney, Agent, or Firm* — Polsinelli P.C.

(57) ABSTRACT

One or more aspects of the present disclosure are directed to providing a single hierarchical construct for defining requirements (connectivity parameters) of a service in a service chain. In one aspect, a single construct for identifying a service in a service chain includes a first object identifying at least one path for accessing an instance of the service within a communication network, a second object identifying a respective communication protocol for the at least one path; and a third object identifying at least a transmission specification for the respective communication protocol in the second object, wherein the second object and the third object are embedded within the first object.

20 Claims, 10 Drawing Sheets

(56) References Cited

U.S. PATENT DOCUMENTS

2022/0030058 A1* 1/2022 Tidemann ........... H04L 47/2475
2022/0150160 A1* 5/2022 Kumar .................... H04L 67/10
2022/0217039 A1* 7/2022 Mishra ................ H04L 41/0803

OTHER PUBLICATIONS

Quinn E.P., et al., "RFC 8300—Network Service Header (NSH)", Jan. 1, 2018 (Jan. 1, 2018), pp. 1-40, XP055733920, Internet Engineering Task Force (IETF) Retrieved from the Internet: URL: https://tools.ietf.org/html/rfc8300 [retrieved on Sep. 25, 2020], p. 3-p. 21.
Cisco: "Data Center Multi-Tier Model Design", May 14, 2008, pp. 1-22.

* cited by examiner

SINGLE HIERARCHICAL CONSTRUCT FOR DEFINING A SERVICE IN A SERVICE CHAIN

CROSS-REFERENCE TO RELATED APPLICATIONS

This application claims the benefit of priority to Indian Provisional Patent Application No. 202341026663, filed Apr. 11, 2023 and entitled "CONSOLIDATED ENDPOINT CONSTRUCT FOR SERVICES IN A SERVICE CHAIN," the disclosure of which is herein incorporated by reference in its entirety

TECHNICAL FIELD

The present technology pertains to service chaining and, more specifically, to providing a single hierarchical construct for defining requirements of a service in a service chain.

BACKGROUND

Service chaining allows network operators to steer traffic through various services, such as firewalls, WAN optimizers, and Intrusion Detection Systems (IDSs), which together enforce specific policies and provide a desired functionality for the traffic. The services in a service chain can be "chained" together in a particular sequence along the path of the traffic to process the traffic through the sequence of services. For example, a network operator may define a service chain (SC) including a firewall and a WAN optimizer for traffic associated with an application. When such traffic is received, it is first routed to the firewall in the service chain, which provides firewall capabilities such as deep packet inspection and access control. After the traffic is processed by the firewall, it is routed to the WAN optimizer in the service chain, which can compress the traffic, apply quality-of-service (QoS) policies, or perform other traffic optimization functionalities. Once the traffic is processed by the WAN optimizer, it is routed towards its intended destination.

To implement a service chain, the network operator can program rules or policies for redirecting an application's traffic through a sequence of services in the service chain. For example, the network provider can program an access control list (ACL) in the network device's hardware, such as the network device's Ternary Content Addressable Memory (TCAM). The ACL can include entries which together specify the sequence of services in the service chain for the application's traffic. The ACL entries can identify specific addresses associated with the application's traffic, such as origin or destination IP addresses associated with the application's traffic, which the network device can use to match an ACL entry to traffic. The network device can then use the ACL entries to route the application's traffic through the sequence of services in the service chain.

Services within a SC must satisfy user specified connectivity and High Availability (HA) requirements.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
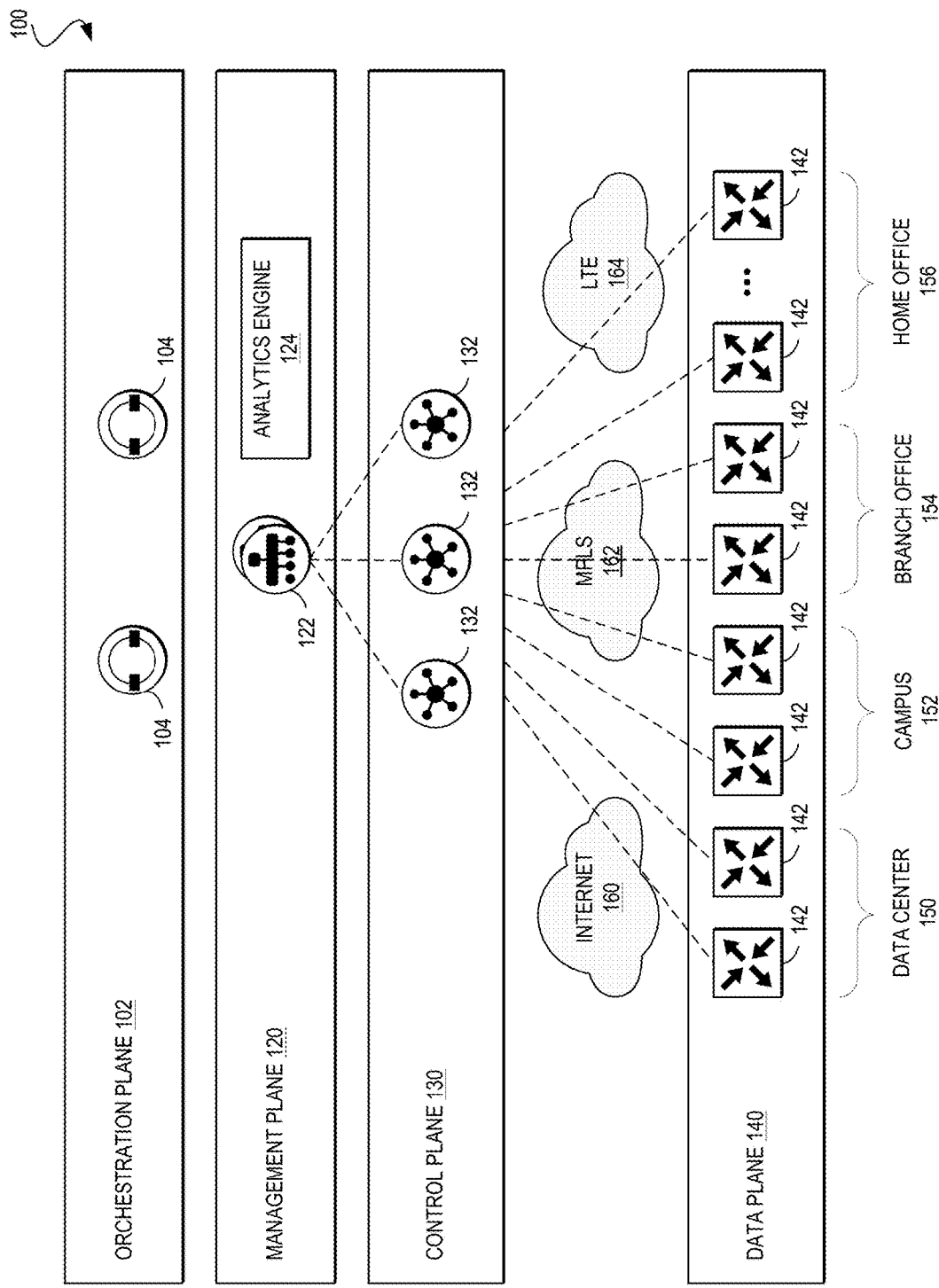
FIG. 1 illustrates an example of a high-level network architecture according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

One or more aspects of the present disclosure are directed to providing a single hierarchical construct for defining requirements (connectivity parameters) of a service in a service chain. As will be described in more detail below. Such hierarchical construct would include multiple levels of objections including at least one High Availability (HA) pair, an attachment handle for each HA pair, and an atom defining transmission and reception interfaces for the attachment handle. Such single construction allows one-to-one mapping of service side networking to a routable name or address.

In one aspect, a network controller includes one or more memories having computer-readable instructions stored therein and one or more processors. The one or more processors are configured to execute the computer-readable instructions to receive connectivity parameters for a service to be used in a service chain in a communication network and generate a single construct for the service. The single construct includes a first object identifying at least one path for accessing an instance of the service over the communication network, a second object identifying a respective communication protocol for the at least one path, and a third object identifying at least a transmission specification for the respective communication protocol in the second object, wherein the second object and the third object are embedded within the first object. The single construct may then be inserted in the service chain.

In another aspect, the first object includes a first path and a second path for accessing the instance of the service.

In another aspect, the first path is an active path and the second path is a backup path to ensure a deterministic failover for underlying network traffic.

In another aspect, the first object includes at least two pairs of paths, a first pair including at least a first active path towards a first instance of the service and a second pair including at least a second active path towards a second instance of the service to enable load balancing of corresponding network traffic when the service is used.

In another aspect, the respective communication protocol is one of an IPv4 communication protocol, IPv6 communication protocol, and a tunnel.

In another aspect, the respective communication protocol is for network traffic transmission.

In another aspect, the respective communication protocol includes a first communication protocol for the network traffic transmission and a second communication protocol for network traffic reception.

In another aspect, the transmission specification for the respective communication protocol is one of an IPv4 interface identifier, IPv6 interface identifier, or a tunnel name.

In another aspect, the single construct further includes a fourth object for enabling a tracking of the service.

In another aspect, the service chain includes a respective single construct for each of a plurality of services, the plurality of services including the service, and each respective single construct has a fifth object indicating a sequence number, the sequence number identifying an order in which a corresponding one of the plurality of services is to be used.

In one aspect, a single construct for identifying a service in a service chain includes a first object identifying at least one path for accessing an instance of the service within a communication network, a second object identifying a respective communication protocol for the at least one path; and a third object identifying at least a transmission specification for the respective communication protocol in the second object, wherein the second object and the third object are embedded within the first object.

In one aspect, a method of generating a single construct for identifying a service in a service chain includes receiving connectivity parameters for a service to be used in a service chain in a communication network and generating a single construct for the service. The single construct includes a first object identifying at least one path for accessing an instance of the service over the communication network, a second object identifying a respective communication protocol for the at least one path, and a third object identifying at least a transmission specification for the respective communication protocol in the second object, wherein the second object and the third object are embedded within the first object. The method further includes inserting the single construct in the service chain.

In one aspect, one or more non-transitory computer-readable media include computer-readable instructions, which when executed by one or more processors of a network controller appliance, cause the network controller appliance to receive connectivity parameters for a service to be used in a service chain in a communication network and generate a single construct for the service. The single construct includes a first object identifying at least one path for accessing an instance of the service over the communication network, a second object identifying a respective communication protocol for the at least one path, and a third object identifying at least a transmission specification for the respective communication protocol in the second object, wherein the second object and the third object are embedded within the first object. The network controller appliance may then insert the single construct in the service chain.

EXAMPLE EMBODIMENTS

As noted above, services within a SC must satisfy user specified connectivity and HA requirements. The challenge is to be able to specify all connectivity and HA requirements within a single construct. Confining these requirements within a single construct allows one-to-one mapping of service side networking to a routable name or address.

One or more aspects of the present disclosure are directed to providing a single hierarchical construct for defining requirements (connectivity parameters) of a service in a service chain. As will be described in more detail below. Such hierarchical construct would include multiple levels of objections including at least one High Availability (HA) pair, an attachment handle for each HA pair, and an atom defining transmission and reception interfaces for the attachment handle.

The disclosure begins with a description of example network architectures for a software-defined network (e.g., SD-WAN) in which SC may be used for servicing various network traffic. An example of a SC configuration will then be described with reference to FIG. 2. Single hierarchical construct for defining requirements (parameters) of a service in a SC will be described next with reference to FIGS. 3-6. An example method of generating a single hierarchical construct for services in a SC will be described with reference to FIG. 7. The description concludes with an example device and system architecture, with reference to FIG. 8, that can be deployed as network elements of a software-defined network for implementing aspects of the present disclosure.

FIG. 1 illustrates an example of a high-level network architecture according to some aspects of the present disclosure. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122 and an analytics engine 124. In some embodiments, the network management appliance(s) 122, using analytics engine 124, can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. Analytics engine 124 can collect and provide various analytics on operation of network 100 and any components thereof. Output of analytics engine 124 can then be used by network appliance(s) 122 to automatically monitor, configure and/or maintain operations of network 100 and/or enable a user to do the same. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 156, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
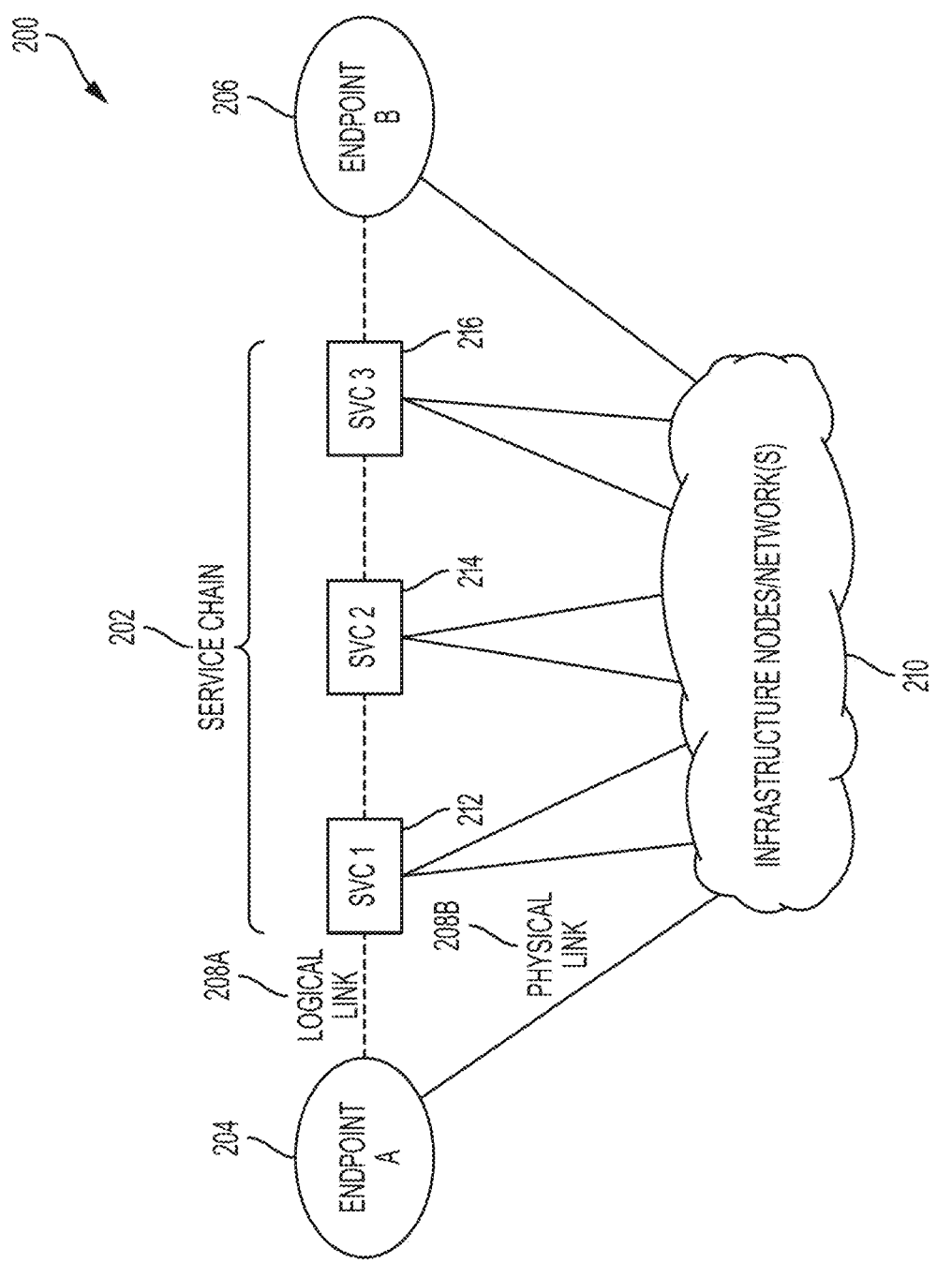
FIG. 2 illustrates a block diagram of an example service chain configuration for application traffic according to some aspects of the present disclosure.

FIG. 2 illustrates a block diagram of an example service chain configuration for application traffic according to some aspects of the present disclosure. In example configuration 200, a service chain 202 is configured to process traffic between endpoint 204 and endpoint 206. Endpoint 204 can include any device or server (physical and/or virtual) on a network, such as a cloud consumer network (e.g., a private cloud or on-premises site), and endpoint 206 can include any device or server (physical and/or virtual) on a different network, such as a public cloud. For example, endpoint 204 can be an application or server on a private cloud and endpoint 206 can be an application or server on a public cloud.

Service chain 202 includes service applications 212, 214, 216, which may be configured to apply specific L4 (Layer 4) through L7 (Layer 7) policies to traffic between endpoint 204 and endpoint 206. Service applications 212, 214, 216 can be implemented via respective virtual machines (VMs), software containers, servers, nodes, clusters of nodes, data centers, etc. Example service applications (212, 214, 216) include, without limitations, firewalls, Intrusion Detection Systems (IDS), Intrusion Detection Systems (IDS), WAN Optimizers, Network Address Translation (NAT) systems, virtual routers/switches, load balancers, Virtual Private Network (VPN) gateways, data loss prevention (DLP) systems, web application firewalls (WAFs), application delivery controllers (ADCs), packet capture appliances, secure sockets layer (SSL) appliances, adaptive security appliances (ASAs), etc.

Service applications 212, 214, 216 in service chain 202 are interconnected via a logical link 208A, which is supported by a physical link 208B through physical infrastructure 210. Physical infrastructure 210 can include one or more networks, nodes, data centers, clouds, hardware resources, physical locations, etc. Traffic from endpoint 204 can be routed to physical infrastructure 210 through physical link 208B, and redirected by physical infrastructure 210 along logical link 208A and through service chain 202.

As noted above, one or more aspects of the present disclosure are directed to providing a single hierarchical construct for defining requirements of a service in a service chain. As will be described in more detail below. Such hierarchical construct would include multiple levels of objections including at least one High Availability (HA) pair, an attachment handle for each HA pair, and an atom defining transmission and reception interfaces for the attachment handle.

Typically, for a service in a SC, the following requirements must be met: (1) Allow tracking of services; (2) Deterministic Failover: Allow a service to have an active path and a deterministic backup path for every active path; (3) Allow active paths and backup paths to be sourced from independent service instances; (4) Load-Balancing: Allow traffic to be load-balanced across various service instances; (5) Allow traffic to be transmitted to and received from a service instance over separate interfaces; (6) Allow service facing interfaces to be physical interfaces or sub-interfaces interfaces or tunnel interfaces; (7) Allow connecting to services that are IPv4-only, IPv6 only, and/or are dual stack (IPv4 and IPv6); and (8) Allow tunnels to carry both IPv6 and IPv4 traffic and be able to use any type of tunnel or transport interfaces.

A proposed single hierarchical construct that embodies all these requirements for a service will now be described with reference to FIG. 3.

Figure 3:
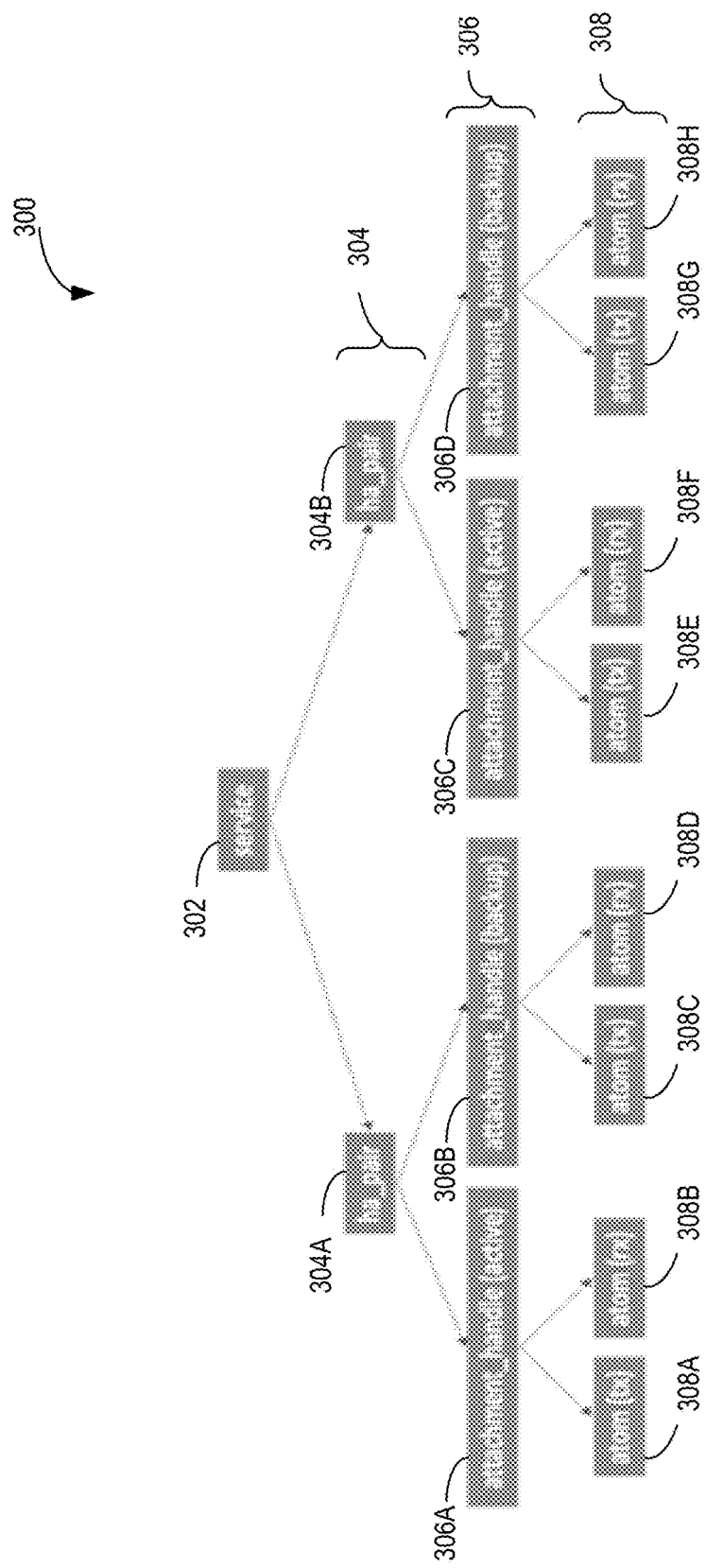
FIG. 3 illustrates an example single hierarchical construct for defining requirements of a service according to some aspects of the present disclosure.

FIG. 3 illustrates an example single hierarchical construct for defining requirements of a service according to some aspects of the present disclosure.

Construct 300 of FIG. 3 for service 302 may be an example hierarchical construct described above. Service 302 can be an abstract representation for any one of services used for servicing traffic in a network as described above including, but not limited to, a FW service, an IDS service, etc. Construct 300 can attach multiple instances of the same service behind the abstract representation of that service 302, to satisfy HA and load-balancing requirements.

In one example, three categories of objects may be defined in three example tiers (levels), namely tier 304, tier 306, and tier 308.

Tier 304 may be the highest tier defining HA requirements. Tier 304 may include at least HA pair such as HA pair 304A and HA pair 304B. Each HA pair may include at least one active transport specification for service 302. Optionally, each HA pair may also include a backup transport specification.

In one non-limiting example, number of HA pairs per service may be at least one and at most four but the present disclosure is not limited thereto and the number of HA pairs can be one or more.

An HA pair enables a deterministic failover as failure on one path can be remedied by using a second path defined in the respective HA pair. An HA pair can include two active paths towards two different instances of service 302 or may include one active and one backup paths.

Service 302 can be IP+ (e.g., IPv4 and/or IPv6) interface connected or can be tunnel connected.

Specifying more than one HA pair allows for load-balancing across the pairs (however, within an HA pair only one of active or backup is used at any given time). Specifying multiple HA pairs with different types, allows for supporting dual stack services (e.g., network traffic can be sent to IPv4 or IPv6 type HA pair depending on the address family of the data packets).

In one example, an HA pair defines active and/or passive paths for both reception and transmission, and the corresponding network address of instances of service 302. An example of a structure of an HA pair such as HA pair 304A and/or HA pair 304B will be described with reference to FIG. 4A.

Tier 306 may be the second highest tier defining an attachment handle for each active and/or backup path identified in corresponding HA pair. For instance, as shown in FIG. 3, attachment handle 306A corresponds to an active path in HA pair 304A while attachment handle 306B corresponding to a backup path in HA pair 304A (assuming HA pair 304A includes one active path and one backup path).

Similarly, attachment handle 306C corresponding to an active path in HA pair 304B while attachment handle 306D corresponding to a backup path in HA pair 304B (assuming HA pair 304B includes one active path and one backup path).

An attachment handle may be exposed by services (e.g., service 302) and transmission and reception connectivity parameters (with reception connectivity parameters being optional) towards instances of service 302. Example structure of an attachment handle will be described below with reference to FIG. 4B.

Tier 308 may be referred to as an atom. It is the lowest ranking tier and an indivisible set of networking parameters for service 302. For instance, as shown in FIG. 3, each attachment handle in tier 306 may include a transmission (Tx) and reception (Rx) specification, which can be either IP+interface (e.g., IPv4 and/or IPv6) or tunnel interface name. Taking only the tunnel name makes networking towards the service agnostic of tunnel type and hence allows the all the encapsulation combinations possible in an IP tunnel (e.g., IPv4-in-IPv4, IPv4-in-IPv6 IPv6-in-IPv6, IPv6-in-IPv4). Furthermore, the infra only expects reachability towards the specified service IP and hence any type of tunnel or interface may be used.

As shown in FIG. 3, atom 308A specifies Tx for attachment handle 306A while atom 308B specifies Rx for attachment handle 306A. Atom 308C specifies Tx for attachment handle 306B while atom 308D specifies Rx for attachment handle 306B. Atom 308E specifies Tx for attachment handle 306C while atom 308F specifies Rx for attachment handle 306C. Atom 308G specifies Tx for attachment handle 306D while atom 308H specifies Rx for attachment handle 306D.

Example structure of atoms 308A-H will be described below with reference to FIG. 4C.

Figure 4A:
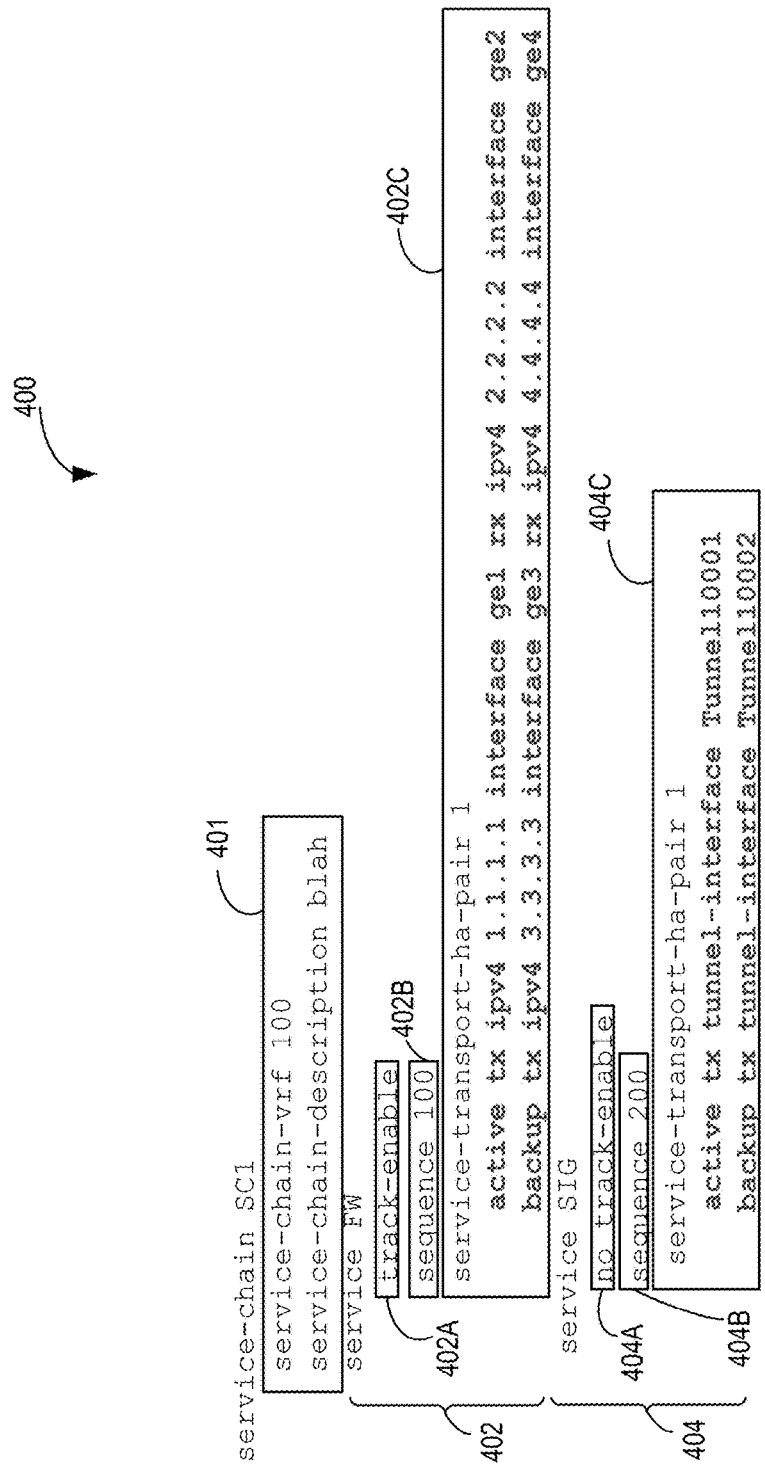
FIG. 4A illustrates an example of a diagram showing the operation of virtual private networks for segmenting a network in accordance with an embodiment.

FIG. 4A illustrates an example structure of an HA pair of single hierarchical construct of FIG. 3 according to some aspects of the present disclosure. FIG. 4A shows examples of HA pairs in tier 304 of FIG. 3.

SC1 400 of FIG. 4A includes two example services, namely FW service 402 and Secure Internet Gateway (SIG) service 404

SC1 400 may include SC identifying information 401 such as the Virtual Routing Function (VRF) through which SC1 400 may be accessed (e.g., VRF_100) and a description of SC1 400.

FW service 402 and SIG service 404 may each have a single hierarchical construct as described above. One element (object) of this single hierarchical construct not described with reference to FIG. 3 is tracking element 402A, which enables tracking of FW service 402. Another is a sequence number 402B, which determines the order of services in SC1 400. In this example sequence number 402B is 100 while sequence number 404B of SIG service 404 is 200. This indicates that a particular network traffic is to undergo FW service 402 first before SIG service 404.

FIG. 4A also shows an example of an HA pair for FW service 402 and SIG service 404 (can be the same as HA pairs 304A and 304B). HA pair 402C of FW service 402 identifies a pair of active and backup paths for both Tx and Rx for FW service 402. Similarly, HA pair 404C of SIG service 404 identifies a pair of active and backup paths for Tx only for SIG service 404.

FIG. 4A also shown a different HA pair 404C for SIG service 404. HA pair 404C differs from HA pair 402C in that (1) only Tx connectivity parameters are included for active and backup paths and (2) SIG service 404 is tunnel connected (e.g., tunnel-interface Tunnel10001 and Tunnel10002 are specified for active and backup paths).

Figure 4B:
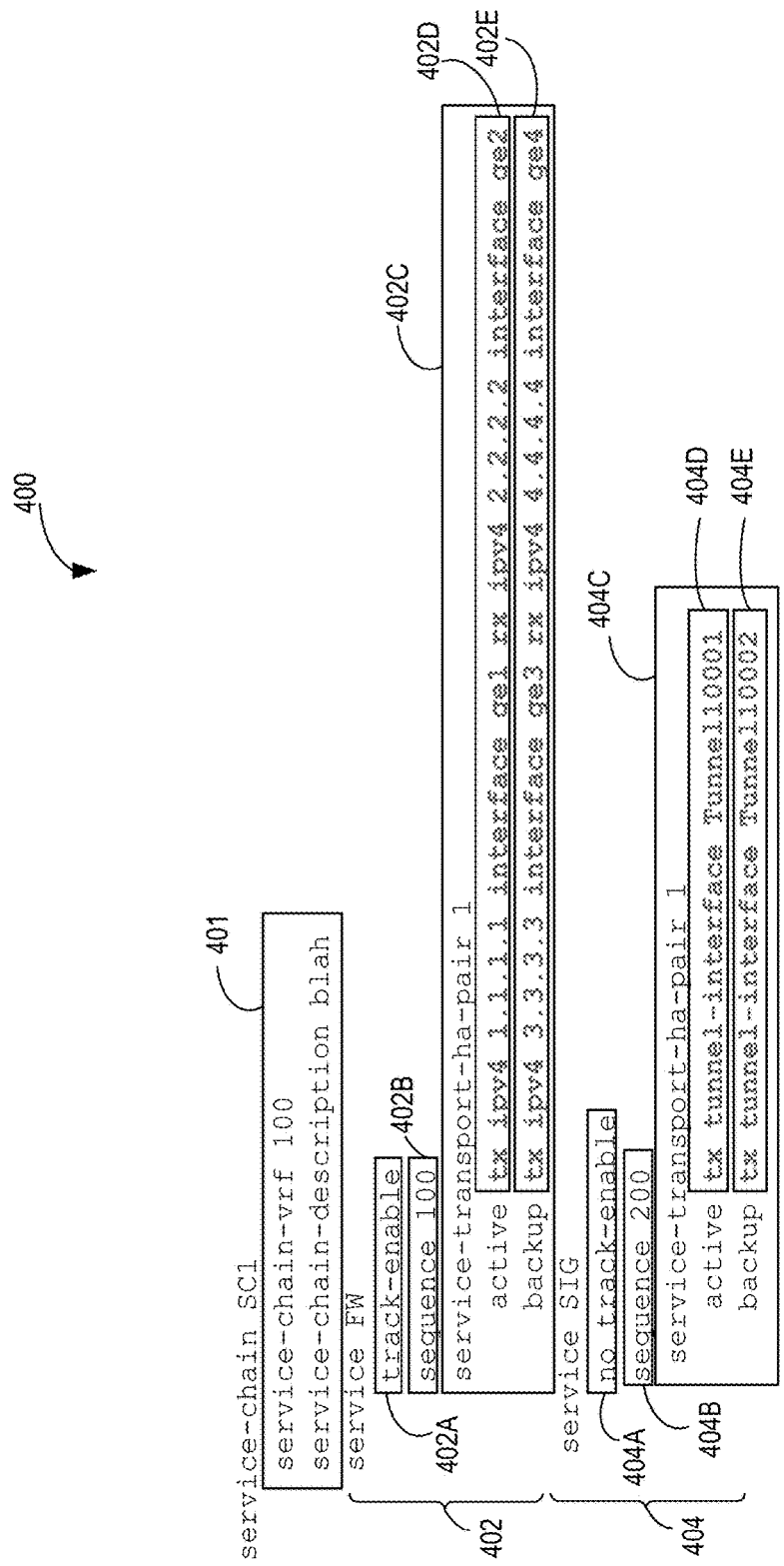
FIG. 4B illustrates an example structure of an attachment handle for each HA pair of FIG. 4A according to some aspects of the present disclosure.

FIG. 4B illustrates an example construct of an attachment handle for each HA pair of FIG. 4A according to some aspects of the present disclosure. FIG. 4B shows examples of attachment handles in tier 306 of FIG. 3.

As can be seen in FIG. 4B, within each HA pair (e.g., HA pair 402C and HA pair 404C), Tx and/or Rx connectivity parameters for each active and backup path are specified by a respective attachment handle. For instance, for active path in HA pair 402C, attachment handle 402D includes Tx IPv4 1.1.1.1 interface ge1 and Rx IPv4 2.2.2.2 interface ge2 for active Rx. Similarly, attachment handle 402E includes Tx IPv4 3.3.3.3 interface ge3 and Rx IPv4 4.4.4.4 interface ge4.

In another example, for active path in HA pair 404C, attachment handle 404D includes Tx tunnel-interface Tunnel10001 and attachment handle 404E includes Rx tunnel-interface Tunnel 10002 are identified.

TX and/or RX specifications for instances of FW service 402 and/or SIG service 404 along with identification of an interface for each are merely exemplary. In other examples, transport specifications can include any combination of IPv4 interface identification, IPv6 interface identification, and/or a tunnel identification.

Figure 4C:
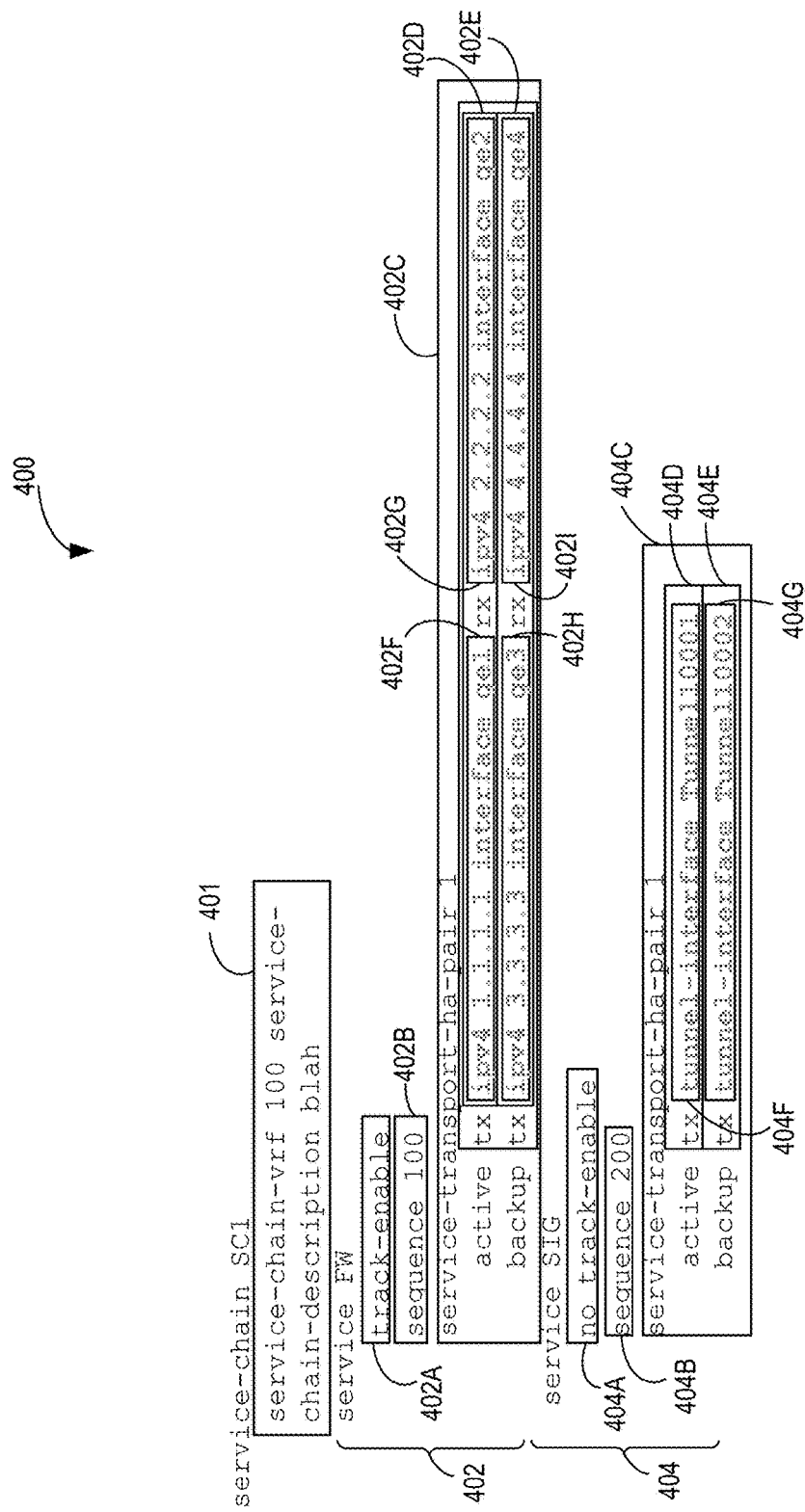
FIG. 4C illustrates an example structure of an atom for each attachment handle in FIG. 4B according to some aspects of the present disclosure.

FIG. 4C illustrates an example construct of an atom for each attachment handle in FIG. 4B according to some aspects of the present disclosure. FIG. 4C shows examples of atoms in tier 308 of FIG. 3.

As can be seen in FIG. 4C, within each attachment handle (e.g., attachment handle 402D and attachment handle 402E in HA pair 402C; attachment handle 404D and attachment handle 404E in HA pair 404C)), an atom forms the Tx and/or Rx connectivity parameters in a given attachment handle. For instance, atom 402F forms Tx connectivity parameters and atom 402G forms Rx connectivity parameters in attachment handle 402D. Similarly, atom 402H forms Tx connectivity parameters and atom 402I forms Rx connectivity parameters in attachment handle 402E.

In another example, atom 404F forms Tx connectivity parameters in attachment handle 404D while atom 404G forms Tx connectivity parameters in attachment handle 404E.

In some examples, service tracking element 402A and 404A may be configured per atom. Tracking features may be used when both Tx and Rx connectivity parameters (if specified) have to be up for a corresponding attachment handle to be considered up. It is also possible that some links are more effectively tracked by a different set of tracker parameters. Track parameters can include, but are not limited to, a time interval (e.g., Duration between each probe transmission), a multiplier (e.g., Number of consecutive probes lost to declare a service to be down), a threshold (e.g., Duration to wait to declare a probe to be lost), etc. For instance, active links might may require a more relaxed tracking because of heavy load.

Figure 5:
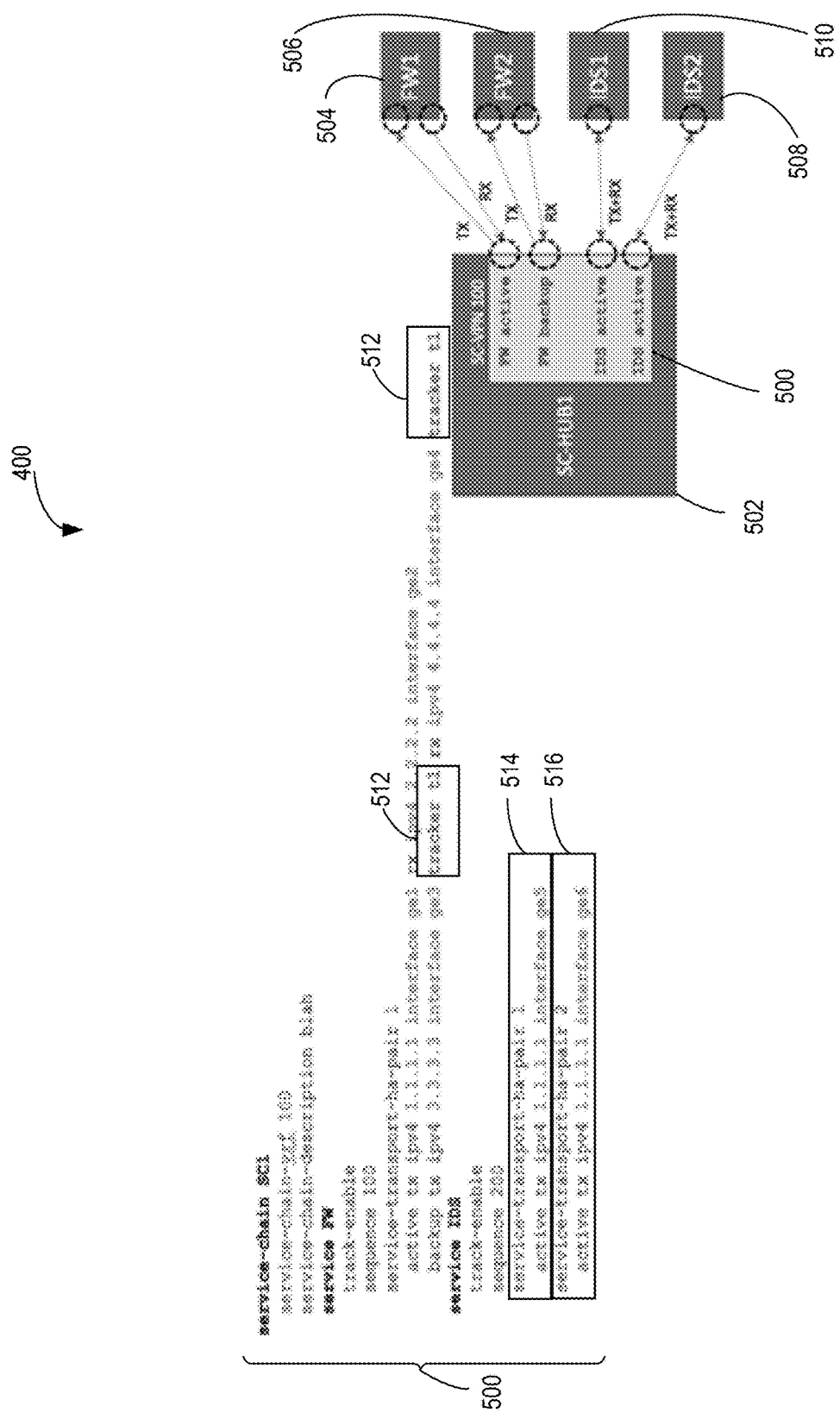
FIG. 5 illustrates an example of implementing a service chain according to some aspects of the present disclosure.

FIG. 5 illustrates an example of implementing a service chain according to some aspects of the present disclosure. In FIG. 5, SC1 500 may be implemented in SC-HUB1 502. SC1 500 may be different than SC1 400 in that SIG service 404 may be replaced with an IDS service. Each of FW service and IDS service in SC1 500 may have a single hierarchical construct as described above with reference to FIGS. 3 and 4A-C. FIG. 5 shows that active and backup attachment handles for FW service and IDS service can come from different services instances (e.g., FW instance 504 and FW instance 506 for FW service and IDS instance 508 and IDS instance 510 for IDS service).

FIG. 5 also shows a different tracker parameter (e.g., tracker parameter 512) assigned to the atoms in the backup attachment of FW service. FIG. 5 also shows an active-active load balancing configuration for IDS service (e.g., IDS service has to HA pairs 514 and 516 each defining an active path).

Figure 6:
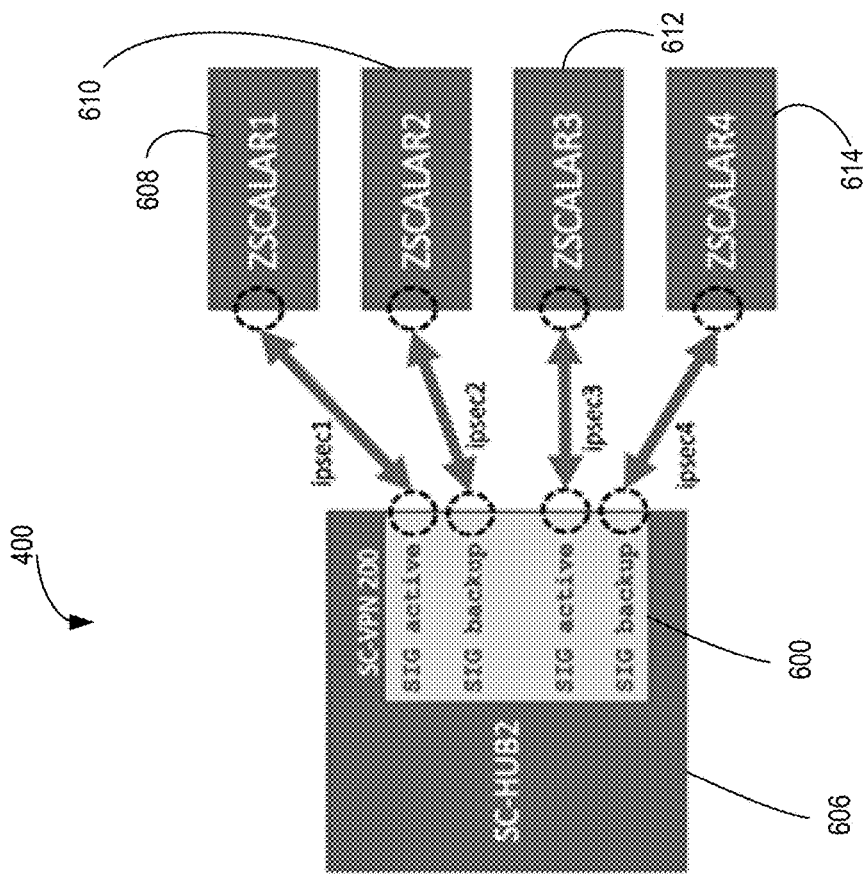
FIG. 6 illustrates another example of implementing a service chain according to some aspects of the present disclosure.
Figure 6:
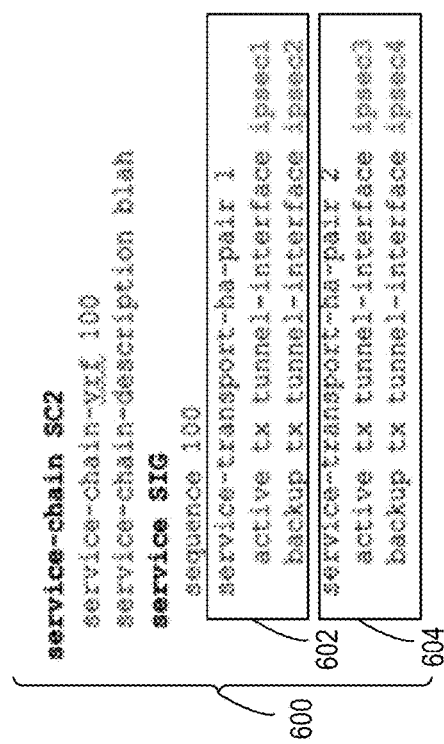

FIG. 6 illustrates another example of implementing a service chain according to some aspects of the present disclosure.

SC2 600 may be formed of SIG service having a single hierarchical construct as described above with reference to FIGS. 3 and 4A-C. SIG service may have HA pairs 602 and 604 each having an active and backup Tx paths with tunnel interface names.

Similar to SC1 500, SC2 600 may be implemented in a hub such as SC-HUB2 606. SC2 600 may be a tunnel connected Secure Access Service Edge (SASE), where active and backups are sourced from different service instances 608, 610, 612, and 614. (e.g., provided by a vendor such as ZScalar. However, the present disclosure is not limited to instances provided by ZScalar).

Example embodiments described above provide a novel and convenient new construct for attaching services within a service chain facilitating tracking, deterministic failover, load balancing, Rx/Tx decoupling, multi-instance service access, and multiple types of connectivity.

Figure 7:
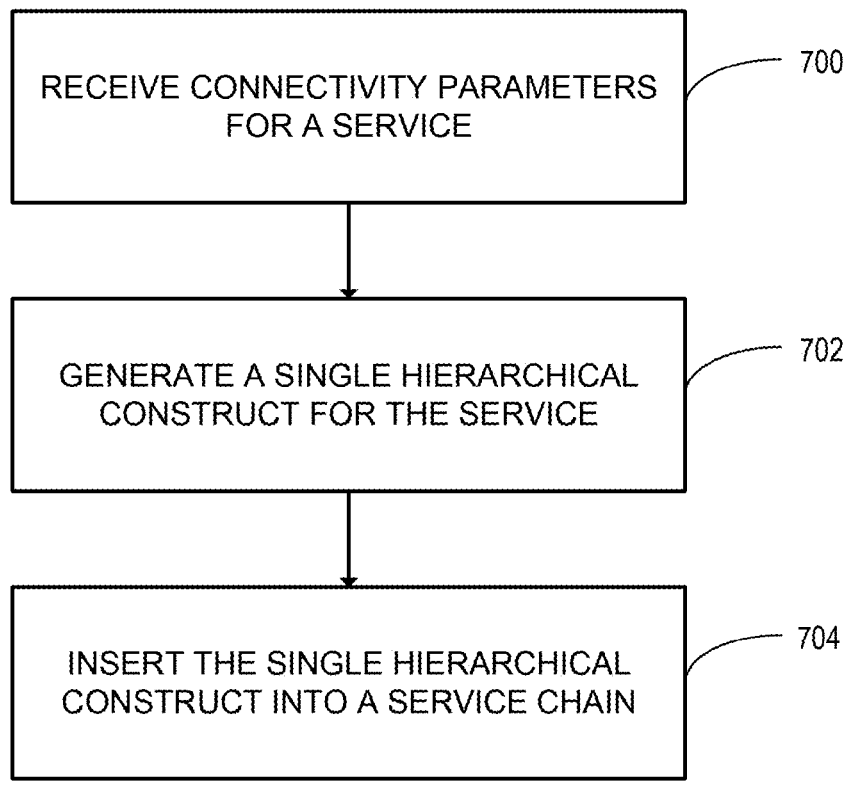
FIG. 7 is a flowchart of an example process for generating a hierarchical single construct for a service in a service chain according to some aspects of the present disclosure.

FIG. 7 is a flowchart of an example process for generating a hierarchical single construct for a service in a service chain according to some aspects of the present disclosure. Process of FIG. 7 may be implemented by a network controller appliance such as physical or virtual Cisco® SD-WAN vManage appliances operating as network management appliance(s) 122 of FIG. 1.

At step 700, network management appliance(s) 122 may receive connectivity parameters for a service. Such connectivity parameters may be received/specified by a user and provided via a terminal (e.g., a dashboard accessed on a laptop, a mobile device, etc.). Connectivity parameters include all path information, IP+interface/tunnel name, network addresses for instances of an underlying service, trackability of the service, sequence number, etc., as described above with reference to FIGS. 3-6.

In another example, connectivity parameters for a service may be determined automatically by network management appliance(s) 122. For instance, a machine learning model may be deployed and utilized by network management appliance(s) 122 that may over time and based on network usage and settings, can learn types of service(s) and/or associated connectivity parameters. Therefore, the output of such machine learning model may be used by network management appliance(s) 122 to determine connectivity parameters for a service.

At step 702, network management appliance(s) 122 may generate a single hierarchical construct for the service for which the connectivity parameters are received at step 700.

The single construct may include a number of objects. For example, a first object identifies at least one path for accessing an instance of the service over the communication network. The first object corresponds to tier 304 and HA pair(s) described above with reference to FIGS. 3-6 (e.g., HA pair 402C and 404C).

In one example, the first object includes a first path and a second path for accessing the instance of the service. The first path can be an active path and the second path can a backup path to ensure a deterministic failover for underlying network traffic (e.g., HA pair 402C and HA pair 404C).

In another example, the first object includes at least two pairs of paths, the first pair including at least a first active path towards a first instance of the service and the second pair including at least a second active path towards a second instance of the service to enable load balancing of corresponding network traffic when the service is used. An example of two pairs of paths include HA pairs 602 and 606 of FIG. 6. As shown in FIG. 6, each of HA pairs 602 and 606 can also include a respective backup path in addition to the active path included therein.

A second object of the single construct can identify a respective communication protocol for the at least one path. The second object corresponds to tier 306 and attachment handles described above with reference to FIGS. 3-6 (e.g., 402D, 402E, 404D, 404E). The respective communication protocol (attachment handle) can expose the service to be used for an underlying network traffic.

In one example, the respective communication protocol is one of an IPv4 communication protocol, IPv6 communication protocol, and a tunnel (e.g., IPSec tunnel, GRE tunnel, VXLAN tunnel, among others). In one example, the respective communication protocol is for network traffic transmission. In another example, the respective communication protocol includes a first communication protocol for the network traffic transmission (e.g., Tx) and a second communication protocol for network traffic reception (e.g., Rx).

A third object of the single construct can identify at least a transmission specification for the respective communication protocol in the second object. The third object corresponds to tier 308 and atoms described above with reference to FIG. 3-6 (e.g., 402F-I, 404F-G). In one example, the transmission specification for the respective communication protocol is one of an IPv4 interface identifier (e.g., IPv4 1.1.1.1 interface ge1, tunnel-interface Tunnel100001, etc.), IPv6 interface identifier, or an IPSec tunnel name.

In another example, the single construct further includes a fourth object for enabling a tracking of the service (e.g., 402A, 404A, etc.). In one example, fourth object can be embedded within the third object (e.g., atom).

In another example, the service chain includes a respective single construct for each of a plurality of services (e.g., single construct for FW service 402 and a single construct for SIG service 404). Each respective single construct may have a fifth object indicating a sequence number (e.g., 402B, 404B). The sequence number may identify an order in which a corresponding one of the plurality of services is to be used.

Single construct generated at step 702 has been referred to as a hierarchical construct with three different layers. Another example description for this construct can be a nested construct because, as shown in and described with reference to FIGS. 3-6, lower tiers (objects) are embedded within the next higher tier (object). For instance, tier 308 is embedded within tier 306 and tier 306 is embedded within tier 304.

At step 704, network management appliance(s) 122 may insert the single hierarchical construct into a service chain such as SC1 400, SC2 500, described above with reference to FIGS. 4-6.

Figure 8:
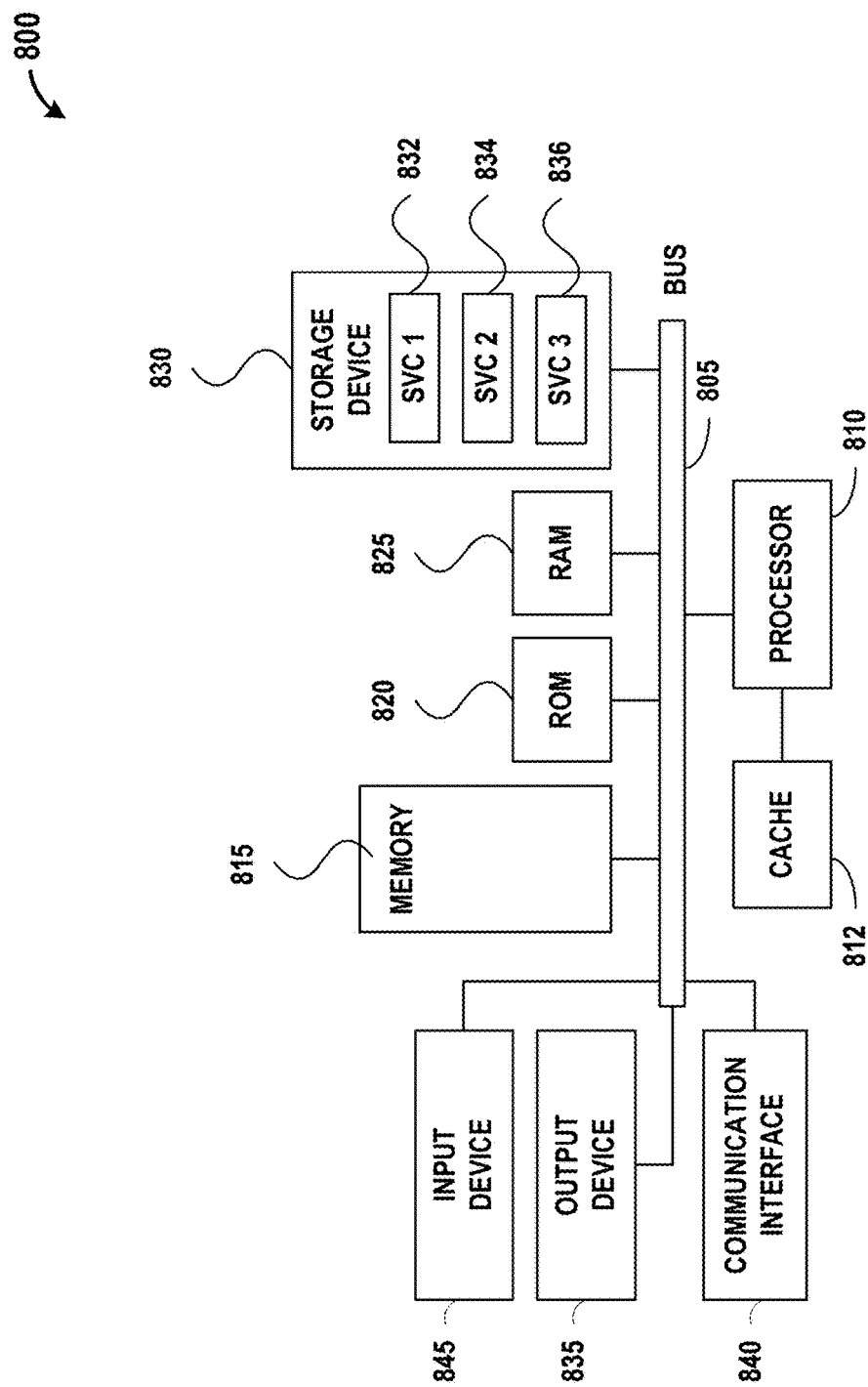
FIG. 8 shows an example of computing system according to some aspects of the present Disclosure.

FIG. 8 shows an example of computing system according to some aspects of the present Disclosure. Example computing system 800 can be for example any computing device making up network appliance(2) 122 and/or any other system component of SD-WAN of FIG. 1 and/or for implementing example embodiments described with reference to FIGS. 1-8. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, read-only memory (ROM) 820, and/or random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A network controller comprising:
one or more memories having computer-readable instructions stored therein; and
one or more processors configured to execute the computer-readable instructions to:
receive connectivity parameters for a service to be used in a service chain in a communication network, wherein the connectivity parameters include at least a transmission connectivity parameter for accessing the service;
generate a single construct for the service based on the connectivity parameter, the single construct having a hierarchical structure with nested objects including:
a first object identifying at least one path for accessing an instance of the service over the communication network;
a second object embedded in the first object and identifying a respective communication protocol for the at least one path; and
a third object embedded in the second object and identifying at least a transmission specification for the respective communication protocol in the second object; and
insert the single construct for the service in the service chain.

2. The network controller of claim 1, wherein the first object includes a first path and a second path for accessing the instance of the service.

3. The network controller of claim 2, wherein the first path is an active path and the second path is a backup path to ensure a deterministic failover for underlying network traffic.

4. The network controller of claim 2, wherein the first object includes at least two pairs of paths, a first pair including at least a first active path towards a first instance of the service and a second pair including at least a second active path towards a second instance of the service to enable load balancing of corresponding network traffic when the service is used.

5. The network controller of claim 1, wherein the respective communication protocol is one of an IPv4 communication protocol, IPv6 communication protocol, and a tunnel.

6. The network controller of claim 1, wherein the respective communication protocol is for network traffic transmission.

7. The network controller of claim 6, wherein the respective communication protocol includes a first communication protocol for the network traffic transmission and a second communication protocol for network traffic reception.

8. The network controller of claim 5, wherein the transmission specification for the respective communication protocol is one of an IPv4 interface identifier, IPv6 interface identifier, or a tunnel name.

9. The network controller of claim 1, wherein the single construct further includes a fourth object for enabling a tracking of the service.

10. The network controller of claim 1, wherein the service chain includes a respective single construct for each of a plurality of services, the plurality of services including the service, and each respective single construct has a fifth object indicating a sequence number, the sequence number identifying an order in which a corresponding one of the plurality of services is to be used.

11. A method comprising:
receiving connectivity parameters for a service to be used in a service chain in a communication network, wherein the connectivity parameters include at least a transmission connectivity parameter for accessing the service;
generating a single construct for the service based on the connectivity parameter, the single construct having a hierarchical structure with nested objects including:
a first object identifying at least one path for accessing an instance of the service over the communication network;
a second object embedded in the first object and identifying a respective communication protocol for the at least one path; and
a third object embedded in the second object and identifying at least a transmission specification for the respective communication protocol in the second object; and
inserting the single construct for the service in the service chain.

12. The method of claim 11, wherein the first object includes a first path and a second path for accessing the instance of the service.

13. The method of claim 12, wherein the first path is an active path and the second path is a backup path to ensure a deterministic failover for underlying network traffic.

14. The method of claim 12, wherein the first object includes at least two pairs of paths, a first pair including at least a first active path towards a first instance of the service and a second pair including at least a second active path towards a second instance of the service to enable load balancing of corresponding network traffic when the service is used.

15. The method of claim 11, wherein the respective communication protocol is one of an IPv4 communication protocol, IPv6 communication protocol, and a tunnel.

16. The method of claim 11, wherein the respective communication protocol is for network traffic transmission.

17. The method of claim 16, wherein the respective communication protocol includes a first communication protocol for the network traffic transmission and a second communication protocol for network traffic reception.

18. The method of claim 15, wherein the transmission specification for the respective communication protocol is one of an IPv4 interface identifier, IPv6 interface identifier, or a tunnel name.

19. The method of claim 11, wherein the single construct further includes a fourth object for enabling a tracking of the service.

20. The method of claim 11, wherein the service chain includes a respective single construct for each of a plurality of services, the plurality of services including the service, and each respective single construct has a fifth object indicating a sequence number, the sequence number identifying an order in which a corresponding one of the plurality of services is to be used.

* * * * *